Jan. 25, 1944.   L. A. SHETLER   2,339,955
AIRCRAFT CONTROL
Filed Feb. 21, 1941   3 Sheets—Sheet 2
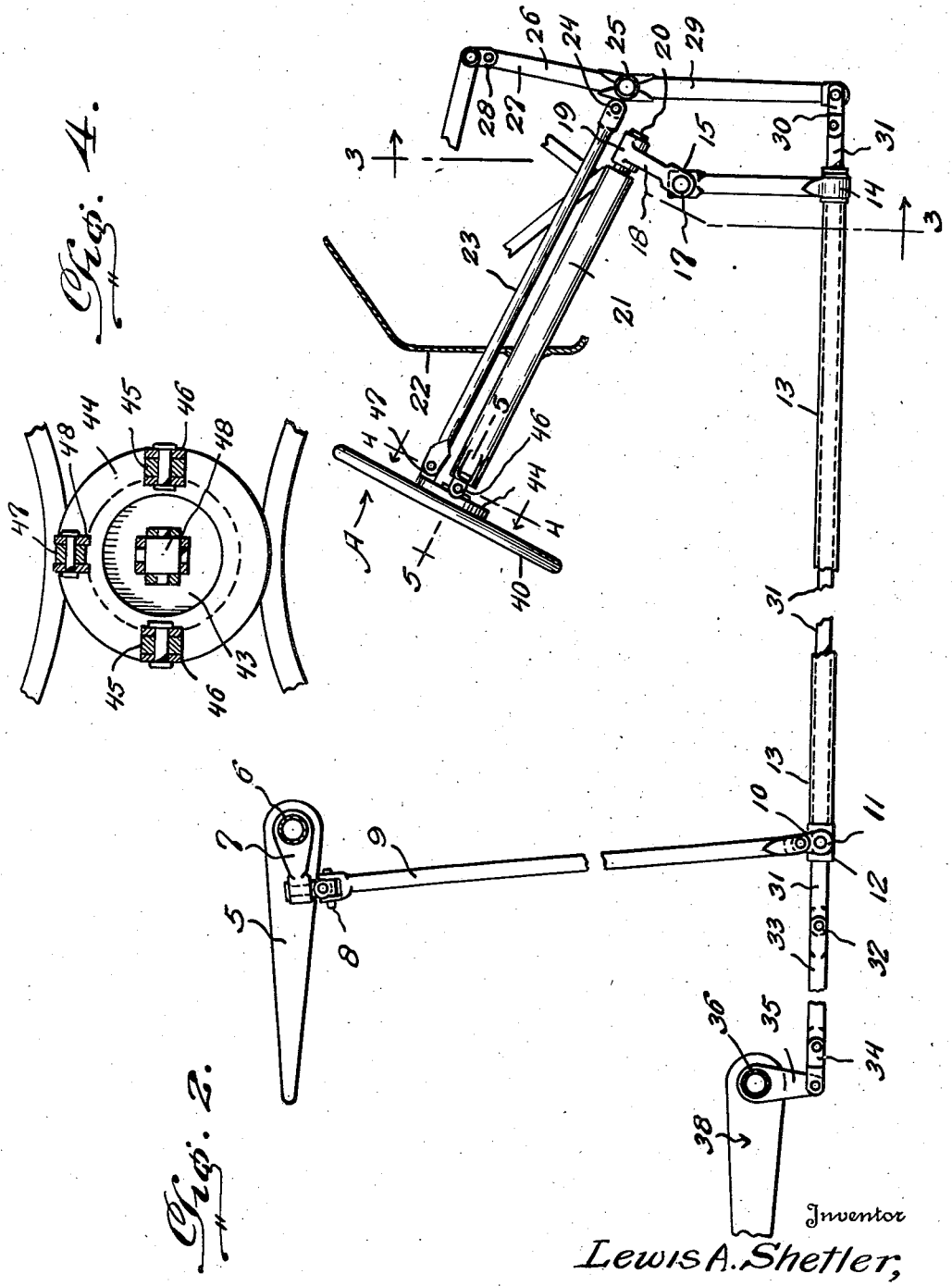
Inventor
Lewis A. Shetler,
By McMorrow & Berman
Attorneys

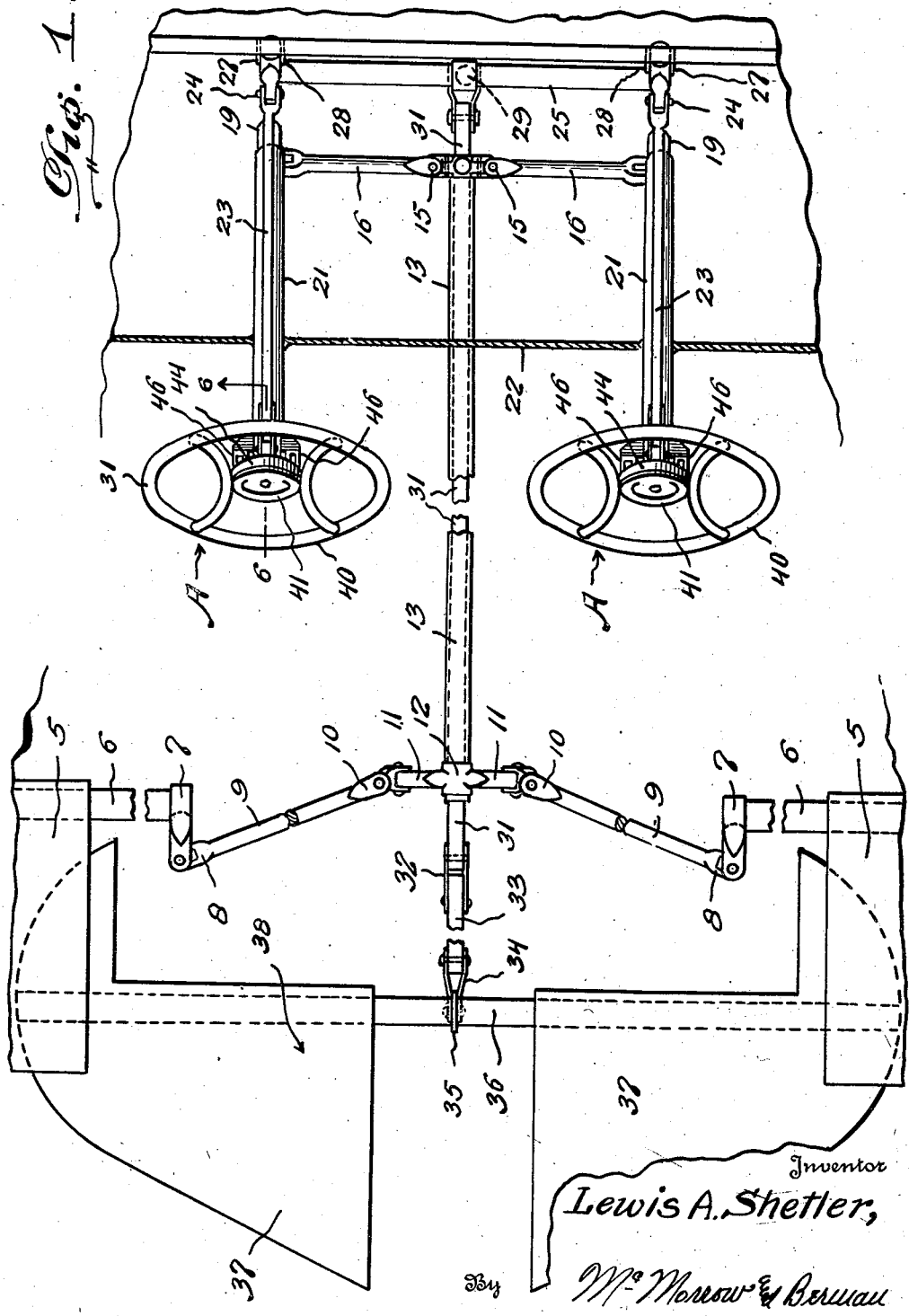

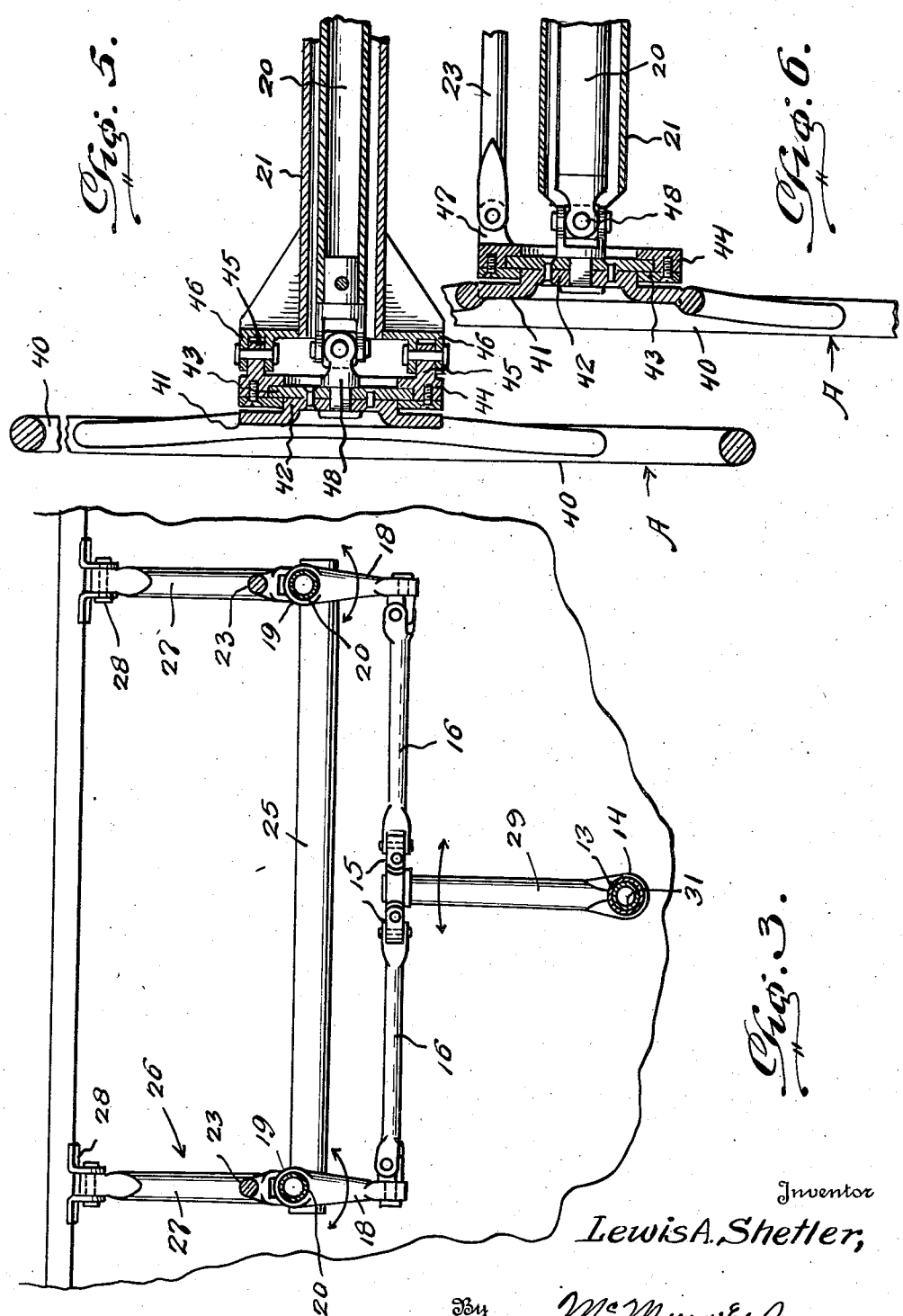

Patented Jan. 25, 1944

2,339,955

UNITED STATES PATENT OFFICE 2,339,955

AIRCRAFT CONTROL

Lewis A. Shetler, Omaha, Nebr., assignor to Morton Aircraft Corporation, Omaha, Nebr.

Application February 21, 1941, Serial No. 380,052

1 Claim. (Cl. 244—83)

My invention is directed to an aircraft control unit and has as one of the principal objects thereof the provision of a control unit so constructed and arranged as to be readily accessible to the pilot at all times and which requires a minimum amount of operating space.

Another object of my invention is to provide a device of the above described character so constructed and arranged as to permit operation of the ailerons and elevator independently of each other and regardless of their respective positions.

An important object of my invention is to provide a device of the character described which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a fragmentary top plan view, partly in section, of an aircraft and illustrating my invention as applied thereto.

Figure 2 is a side elevation of the structure disclosed in Figure 1.

Figure 3 is a sectional view taken on the line 3—3 of Figure 2.

Figure 4 is a sectional view taken on the line 4—4 of Figure 2.

Figure 5 is a sectional view taken on the line 5—5 of Figure 2.

Figure 6 is a sectional view taken on the line 6—6 of Figure 1.

As illustrated in the drawings I provide a pair of ailerons 5 equipped with transversely extending rock shafts or torque tubes 6 having fixed to their inner ends links 7, the latter having pivotally connected thereto universal joints 8 carried on the outer ends of rods 9, the inner ends of the latter having connected thereto universal joints 10 mounted on the outer ends of a pair of laterally and oppositely extending arms 11. The inner ends of the arms 11 are fixed to a collar 12 carried on the rear end of a forwardly extending hollow shaft 13. The front end of the shaft 13 has fixed thereto a collar 14 provided with oppositely disposed ears to which are connected universal joints 15 fixed on the inner ends of a pair of laterally and upwardly extending rods 16 respectively.

The outer ends of the rods 16 are provided with universal joints connecting said rods to the inner ends of inwardly and downwardly extending arms 18, the outer ends of said arms 18 being provided with sleeves 19 fixed to the lower ends of hollow shafts 20 respectively. The shafts 20 are rotatably mounted within hollow columns 21 respectively, the latter being fixed to the instrument panel 22 of the aircraft as illustrated in Figures 1 and 2 of the drawings. Juxtapositioned with respect to the adjacent column 21, is a reciprocating elevator control rod 23, the latter, together with the adjacent shaft 20 and column 21 constituting parts of a control unit A, a pair of said units being employed for the purpose of permitting dual control of the aircraft as clearly illustrated in the drawings.

The lower end of each rod 23 is pivotally connected as at 24 to a subjacent zygon or cross bar 25 of a yoke 26, the upper ends of the sides 27 of said yoke 26 being pivotally connected to bearings 28 mounted on the aircraft prejacent the instrument panel 22. Interjacent the ends thereof, the cross bar 25 has fixed thereto the upper end of a downwardly extending arm 29, the lower end of said arm 29 being pivotally connected, as at 30, to the front end of a shaft 31, the latter being slidably mounted within the shaft 13.

The rear end of the shaft 31 is connected as at 32, to the front end of an auxiliary shaft 33, the latter having its rear end pivotally connected, by a pair of links 34, to the lower end of a rocker arm 35. The upper end of the rocker arm 35 is fixed to a transverse rock shaft 36 connected to the lateral sections 37 of an elevator whereby to effect unitary pivoting or rocking of said sections of the elevator. Obviously, rotation of the shaft 13 by one of the shafts 20 effects pivoting of the ailerons while reciprocation of one of the rods 23 effects rocking or pivoting of the elevator through the medium of their respective shafts 13 and 31.

Inasmuch as each of the control units A are of an identical construction a detail description of one will suffice, it being understood that the reference characters indicative of parts of one unit are indicative of like parts of the other unit. Each unit A comprises a steering or control wheel 40 provided with a hub 41 formed with a centrally disposed boss 42 having riveted thereto a bearing plate or disk 43, the latter being of a materially greater diameter than said boss to provide a circumferentially disposed marginal portion extending about and away from said boss and which marginal portion is rotatably mounted within a sectional bearing 44, the latter having upper and lower sections and with the upper section overlying the marginal portion of the plate and secured to the lower section by means of screws. The lower section of the bearing 44 is provided with a pair of oppositely disposed hinge members 45 pivotally connected to similar members 46 fixed to the upper end of the column 21. The lower section of the bearing 44 is provided with a bifurcated ear 47 having pivotally connected therein the upper end of the rod 23. Obviously, fore and aft movement of the wheel 40 serves to effect reciprocation of the rod 23 and operation of the elevator through the medium of the shaft 31 and associated parts.

Centrally fixed to the hub 41 and plate 43 is the upper end of a universal joint 48, the lower end of said joint being fixed to the upper end of the shaft 20. Obviously, by rotating the wheel 40 with respect to the bearing 44 and column 21, operation of the ailerons 5 is effected through the medium of the shaft 13 and associated parts.

From the foregoing, it will be apparent that the elevator and ailerons may be independently operated regardless of their positions with respect to each other. It will also be apparent that I have provided a simple and efficient control means for operating the ailerons and elevator of an aircraft and which requires a minimum of operating space.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

In a steering mechanism for aeroplanes, a fixed hollow column, a shaft journaled in the column, means connecting said shaft to ailerons, rigid opposed arms formed on the column, an annular member pivoted on said arms for a rocking movement and including annular detachably connected sections coacting with each other in providing an annular seat, a steering wheel including a hub having a boss rotatably received within one of the annular sections, a disc secured on the boss and projecting in the annular seat beyond the hub for rotatably securing the wheel to the annular member and for permitting the wheel to be employed for rocking the anular member on the arms, means connecting the annular member to an elevator, and a universal joint secured to the shaft and to the boss for rotating the shaft by the steering wheel.

LEWIS SHETLER.